United States Patent

Kawamoto et al.

[11] Patent Number: 5,936,634
[45] Date of Patent: Aug. 10, 1999

[54] IMAGE FORMING APPARATUS AND METHOD OF FORMING IMAGES BY INTERPRETING A PAGE DESCRIPTION LANGUAGE WITH A PLURALITY OF PROCESSORS

[75] Inventors: Koushi Kawamoto; Tohru Fuse; Shoji Sakamoto, all of Nakai-machi, Japan

[73] Assignee: Fuji Xerox Co., Ltd., Tokyo, Japan

[21] Appl. No.: 08/743,210

[22] Filed: Nov. 5, 1996

[30] Foreign Application Priority Data

Dec. 28, 1995 [JP] Japan .................................. 7-343380

[51] Int. Cl.$^6$ ...................................... G06T 1/20
[52] U.S. Cl. ........................ 345/435; 345/421; 345/433
[58] Field of Search ................................. 345/435, 421, 345/522, 441, 505

[56] References Cited

U.S. PATENT DOCUMENTS

| | | | |
|---|---|---|---|
| 4,967,392 | 10/1990 | Werner et al. | 345/505 |
| 5,333,246 | 7/1994 | Nagasaka | 345/433 |
| 5,574,847 | 11/1996 | Eckart et al. | 345/505 |
| 5,745,121 | 4/1998 | Politis | 345/435 |

FOREIGN PATENT DOCUMENTS

| | | |
|---|---|---|
| A-1-188374 | 7/1989 | Japan . |
| A-7-104987 | 4/1995 | Japan . |
| WO 91/15831 | 10/1991 | WIPO . |

*Primary Examiner*—Phu K. Nguyen
*Assistant Examiner*—Huedung X. Cao
*Attorney, Agent, or Firm*—Oliff & Berridge, PLC

[57] ABSTRACT

When an instruction sequence is divided into a plurality of subsequences and executed by a plurality of painting instruction operators, an effective parallel schedule can be drawn up even if there may exist image elements overlapped one another, thus enabling high-speed painting instruction to be executed. There are provided a control information configuror for giving a directed branch to a subsequence having order dependence upon receipt of subsequences divided by a sequence divider and for excluding, when the subsequence with the branch given has another subsequence having order dependence, the subsequence from the determination targets for order dependence; and a scheduler for processing, when on allocating subsequences to a painting instruction operator at the execution target, the subsequences to be allocated are dependent upon subsequences to be executed outside of the allocatee, after the processing of subsequences at the host is awaited.

13 Claims, 15 Drawing Sheets

FIG. 4

[INSTRUCTION SEQUENCE Di]

0.0 0.0 MOVETO
0.1 0.3 0.5 0.7 0.7 0.5 CURVETO

→ CONVEX ( 0.0, 0.0, 0.1, 0.3, 0.5, 0.7, 0.7, 0.5 )

IMAGE FORMING APPARATUS AND METHOD OF FORMING IMAGES BY INTERPRETING A PAGE DESCRIPTION LANGUAGE WITH A PLURALITY OF PROCESSORS

BACKGROUND OF THE INVENTION

1. Field of the Invention

The present invention relates to an image forming apparatus, and more particularly to an image forming apparatus for obtaining image information by executing instruction sequence expressed by language for describing an image by means of a plurality of instruction processing devices.

2. Description of the Related Art

With the development of line printers suitable for high-speed digital printing such as electrophotography system and ink jet system, a printing control method using "page description language" has generally come into wide use which has broken from the conventional printing method, in which importance is attached to character information, and is capable of handling images, graphic forms, characters, etc. in the same manner, and freely controlling enlargement, rotation, and deformation of characters and graphic forms, etc. In the 1980's, various page description language were developed, and their representative examples are PostScript (trademark of Adobe Systems, Inc.) and Interpress (trademark of Xerox Inc.), and a large number of page description language are used for various printers.

In conventional page description language processing line printers, the central processing unit (CPU) in the line printer has interpreted successively, and the printer therein has carried out a printing operation. As an example thereof, it is described in Japanese Published Unexamined Patent Application No. Hei 1-188374 that there are provided a storage unit for receiving a program (hereinafter, referred to as printing information) for printing to be fed from a computer (hereinafter, referred to as host device) to store it, a processor for successively interpreting the printing information, and a line printer for printing in accordance with the printing information thus interpreted, so that, after the printing information is once transmitted from the host device to the line printer, the printing information is translated on the line printer side to carry out a printing operation to thereby reduce the load on the host device, thus improving the processing speed of the entire system.

In a decentralized environment using a network, however, a form in which a line printer is commonly used has become standard. The line printer should receive printing requests from a large number of host devices, and interpret and execute printing information described in page description language. If the line printer is used simultaneously by a large number of host devices, the waiting time until the result is obtained since printing is requested becomes long because the interpretation and execution of printing information described in the page description language in the line printer are performed in series. This situation has become more and more serious with the increased printing resolution.

Thus, in order to eliminate the aforesaid waiting time and form an image at high speed, a technique of interpreting and executing painting instructions in parallel has been proposed. In the technique disclosed in, for example, PCT/JP91/00456, formation and processing for a printed image are performed on a plurality of computers dispersed on a network, and the technique disclosed in Japanese Published Unexamined Patent Application No. Hei 7-104987 is to analyze and generate the image operating procedure in a document printing program for generating a parallel execution code.

In the aforesaid conventional parallel processing method, however, a division of instruction sequence is required to execute painting instructions in parallel, but the instruction sequence has not always been sufficiently divided. More specifically, in the technique disclosed in PCT/JP91/00456, the painting operation is executed in parallel as plural processes by dividing an area, on which an image is formed, in a band shape or in a mesh shape, but the parallelism of the painting instruction sequence actually inputted has not been sufficiently drawn out. Also, in the technique disclosed in Japanese Published Unexamined Patent Application No. Hei 7-104987, whether or not painting can be executed in parallel is determined by directly comparing the pixels, whereby the image has been formed so far, with pixels, whereby an image is formed by the execution of the next instruction, thus causing a great processing overhead. In this case, there is a possibility that a plenty of time will be consumed after all in consideration of total time from a time at which the user completes the editing operation and instructs printing to a time at which he obtains the page.

Further, in any of the aforesaid invention, as regards an area which cannot be divided because graphic forms are overlapped, processing should be successively performed, and this leads to a problem that the speed cannot be sufficiently increased.

SUMMARY OF THE INVENTION

The present invention has been achieved in the light of the above-described problems, and is aimed to provide an image forming apparatus capable of drawing up an effective parallel schedule even if there may exist image elements overlapped one another in the printing information, and executing high-speed painting instructions.

It is also an object of the present invention to provide a method of forming images capable of executing high-speed painting instructions for such printing information as to have image elements overlapped one another.

FIG. 1 is a view showing the principle and structure of an image forming apparatus according to the present invention.

In FIG. 1, an image forming apparatus is composed of: sequence division means 1 for receiving instruction sequence to form an image described in page description language, etc., and dividing this sequence into a plurality of subsequences; dependence analysis means 2a and control information configuration means 2b for constituting structural data having order relation by determining order dependence among each subsequence; scheduling means 3 for controlling the execution of the subsequences; a plurality of painting instruction operation means 4a, 4b, . . . , and 4n for executing the subsequences; and data collection means 5 for synthesizing partial images from these painting instruction operation means 4a, 4b, . . . and 4n into one overall image.

The dependence analysis means 2a is constructed so as to determine the order dependence of processing among these subsequences divided. The control information configuration means 2b is constructed so that the subsequence having the order dependence is provided with a directed branch, and that if the subsequence provided with the branch has another subsequence having the order dependence, the subsequence is excluded from the determination targets for order dependence. The scheduling means 3 is constructed so as to receive subsequence groups generated by the sequence division means 1 and to allocate them to the painting instruction operation means 4a, 4b, . . . and 4n in a state in which the order relation of processing is retained.

According to an image forming apparatus constructed as described above, the instruction sequence, in which the image forming processing is described, is first divided into sets of subsequences, each of which can execute without requiring insufficient information for others in the sequence division means 1. Next, the dependence analysis means 2a analyzes whether or not there exists order dependence of processing among each subsequence constituting the sets of these subsequences. The subsequence here is one consisting of a painting instruction in the aforesaid instruction sequence and an instruction required to execute this painting instruction, or one consisting of a plurality of painting instructions in the foresaid instruction sequence and instructions required to execute these painting instructions.

The control information configuration means 2b constitutes the dependence relation of the entire instruction sequence as one structural data, and prepares for a schedule for processing and executing while the dependence relation is retained.

The scheduling means 3 draws up a processing plan to allocate the subsequence groups to the painting instruction operation means 4a, 4b, . . . and 4n on the basis of the structural data prepared by the control information configuration means 2b. If, when the scheduling means 3 allocates a certain subsequence to the painting instruction operation means at an execution target, the subsequence to be allocated is dependent upon a subsequence to be executed outside of the painting instruction operation means, processing is arranged to be performed after processing by the subsequence at the host is awaited. The subsequence is transferred to a plurality of painting instruction operation means for the execution in accordance with a schedule prepared. The execution result is collected by the data collection means 5 to generate an image at high speed which the first instruction sequence has intended to obtain.

Also, according to the present invention, there is proposed a method of forming images at high speed by executing the instruction sequence, which forms an image, by a plurality of painting instruction operation means. According to this method of forming images, the instruction sequence is first divided into a plurality of subsequences. Next, it is determined whether or not in each of the plurality of subsequences thus divided, there is order dependence of processing among each subsequence, and if a first subsequence is dependent upon a second subsequence, a directed branch is given from the first subsequence to the second subsequence to constitute the structural data concerning the order relation of subsequences. On determining the order dependence on the first subsequence, a subsequence, which receives a directed branch from the second subsequence, is excluded from the determination targets for order dependence on the first subsequence, and the second subsequence selects a third subsequence independent of a subsequence receiving a directed branch. Thus, it is judged whether or not the first subsequence has dependent relation only with the subsequence which exists in the painting instruction operation means at its allocates, and if the first subsequence has no dependent relation outside of the subsequence existing at the allocatee, the first subsequence is allocated to the allocatee as it is. If the second subsequence allocated to other allocatees than the allocatees of the first subsequence has order dependence, the first subsequence is allocated to its allocatee after the completion of processing by the second subsequence is awaited. Finally, the respective images obtained by the execution of subsequences by each painting instruction operation means are collected to synthesize into an overall image.

In the determination of order dependence of processing among subsequences, the subsequence, which has already been determined to have order dependence, is excluded from the determination targets for order dependence on the first subsequence, to thereby reduce the load of processing and enable high-speed processing. Yet, if the first subsequence, which is going to be allocated, has order dependence on a subsequence allocated out of the allocatees, design is made such that the first subsequence is allocated to its allocatee after the completion of processing of the subsequence is awaited, whereby the subsequence can be executed while the order relation is retained.

BRIEF DESCRIPTION OF THE DRAWINGS

FIG. 4 is a view showing an example of expression of an operation range of the convex closure;

DETAILED DESCRIPTION OF PREFERRED EMBODIMENTS

First, the outline of the present invention will be described with reference to the drawings.

Figure 1:
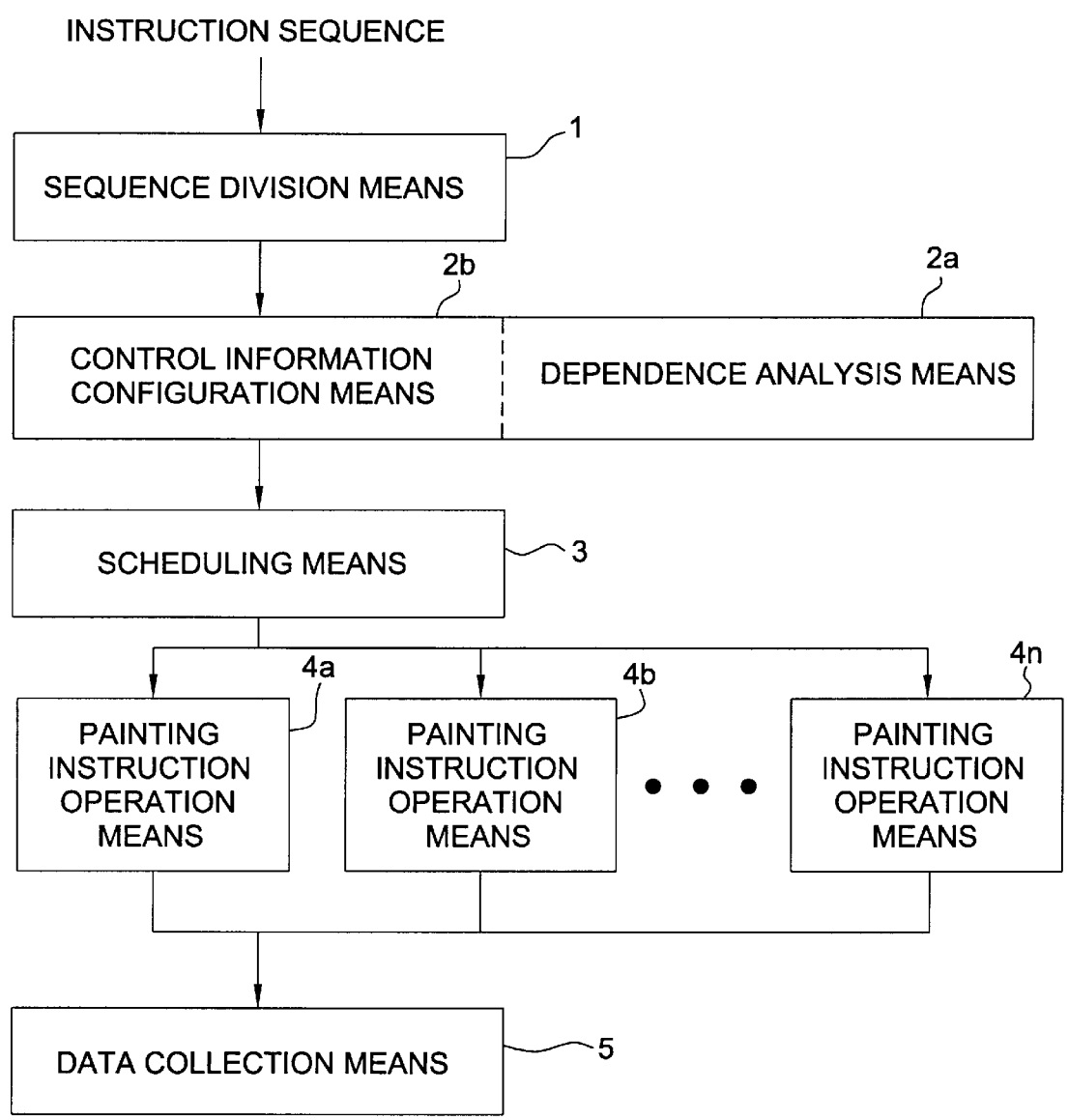
FIG. 1 is a view showing the principle and structure of an image forming apparatus according to the present invention.

FIG. 1 is a view showing the principle and structure of an image forming apparatus according to the present invention.

An image forming apparatus according to the present invention is composed of: sequence division means 1 for receiving instruction sequence to form an image described in page description language or the like, and dividing it into a plurality of subsequences; dependence analysis means 2a and control information configuration means 2b for determining order dependence among subsequences divided to constitute structural data having order relation; scheduling means 3 for controlling allocation of execution of subsequences; a plurality of painting instruction operation means 4a, 4b, . . . and 4n for receiving subsequences allocated by the scheduling means 3 to execute it in parallel; and data collection means 5 for integrating partial images individually formed by these painting instruction operation means 4a, 4b, ... and 4n into one overall image.

The sequence division means 1 is constructed so that an instruction sequence, in which image formation processing has been described, can be divided into sets of subsequences, each of which can be executed without necessitating insufficient information from others. The dependence analysis means 2a is constructed so that subsequence groups divided by the sequence division means 1 are inputted to determine the order dependence of these subsequence groups. The control information configuration means 2b is constructed so that it receives an analysis result by the dependence analysis means 2a to the effect that a first subsequence is dependent upon a second subsequence, and a directed branch is given from the first subsequence to the second subsequence to constitute structural data concerning the order relation of the subsequence groups, and that the control information configuration means 2b instructs the dependence analysis means 1b to exclude, from the determination targets for order dependence on the first subsequence, a subsequence which receives the directed branch from the second subsequence, to which the directed branch has been given. Accordingly, the dependence analysis means 1b selects, as the determination targets for order dependence on the first subsequence, a third subsequence, which is independent of the subsequence, from which the second subsequence receives the directed branch. The scheduling means 3 is constructed so that it receives subsequence groups generated by the sequence division means 1, and if the first subsequence has no dependence on other subsequences than subsequences which exist in the painting instruction operation means at the allocatee, adds them to the execution system at the allocatee as it is. If the first subsequence has order dependence on the second subsequence allocated to a painting instruction arithmetic unit different from the allocatee, the structure is arranged so that indicative information to the effect that image data formed before the first subsequence was processed is transferred to the data collection means 5, is added to the execution system at the allocatee, and thereafter the first subsequence 1 is added.

The dependence analysis means 2a constructed as described above preferably has, when the subsequence includes graphic generation instruction, painting area decision means for analyzing partial space areas which are painted in accordance with the graphic generation instruction, and area comparison means for determining whether or not the partial space areas analyzed are overlapped one another, and is constructed so that the dependence relation between subsequences is determined by the overlapped relation of the partial space areas.

According to this image forming apparatus, the sequence division means 1 first divides the instruction sequence, in which the image formation processing has been described, into sets of subsequences. Next, the dependence analysis means 2a analyzes whether or not there exists order dependence of processing among each subsequence. The order dependence of processing here means whether or not any difference takes place in a completed image when the execution order between a subsequence and another subsequence is changed. This processing can be effectively performed by expressing, for example, a range, in which the subsequence operates, as a partial space area on the generated image to analyze the overlap relation between these areas.

Since subsequence groups having order dependence cannot be simultaneously executed by the plurality of painting instruction operation means 4a, 4b, ... and 4n, such order relation must be always observed. The control information configuration means 2b constitutes the dependent relation for the entire instruction sequence as one structural information to prepare for a schedule for processing while the dependent relation is retained.

The scheduling means 3 prepares a procedure of allocating instruction sequence groups to painting instruction operation means 4a, 4b, ... and 4n on the basis of the structural information prepared by the control information configuration means 2b. On allocating a subsequence to the painting instruction operation means at the execution target, if the scheduling means 3 is dependent upon a subsequence to be executed outside of the painting instruction operation means, synchronous information, which instructs to await the processing of the subsequence at the host, is added. Which painting instruction operation means the subsequence should be allocated to may be determined in accordance with an arbitrary rule, but it preferably follows, for example, SPT (shortest processing time) rule or EDD (earliest date of delivery) rule. A schedule thus prepared is transferred to the plurality of painting instruction operation means so that it is executed in parallel on one occasion, and is successively executed in synchronization with another processing on another occasion. Finally, these results are collected by the data collection means 5 to generate the target image, i.e., the same image as one, which the original single painting instruction sequence intended to generate, is generated at high speed.

Heretofore, interference of image parts which occurs in the execution of an image painting instruction has been processed by one arithmetic means with all parts, which interfere one another, as one part, thus causing a load centralized. Thus, there has been adopted a method of re-dividing parts, which interfere one another, according to a predetermined division rule to process in parallel by a plurality of arithmetic means. According to the present invention, a target to be processed by a plurality of operation processing means is a subsequence of image instruction consisting of an unit itself of painting instruction, and can be processed in parallel quickly without necessitating any process for re-processing the target to be processed by the arithmetic means because allocation to a plurality of arithmetic means and synthesis from a plurality of arithmetic means are performed in accordance with the order dependence of the subsequence.

Next, embodiments of the present invention will be described by exemplifying an image forming apparatus roughly connected by a network.

Figure 2:
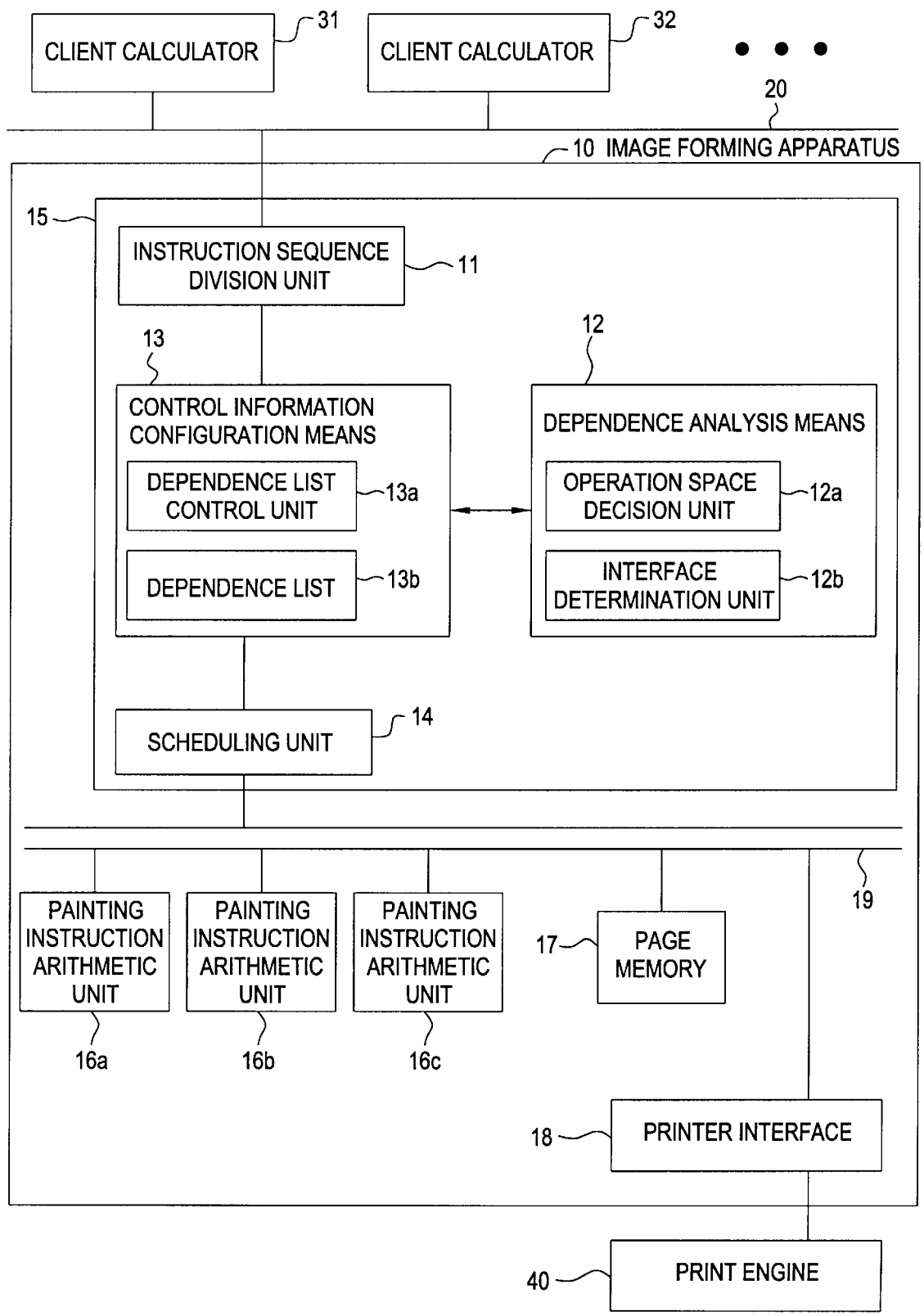
FIG. 2 is a block diagram showing an example of construction of the image forming apparatus.

FIG. 2 is a block diagram showing a structural example of the image forming apparatus.

An image forming apparatus 10 shown is connected to client calculators 31, 32, ... through an Ethernet 20 which is one of local area networks, and is also connected to a print engine 40 for print-outputting the processing result.

Client calculators 31, 32, ... are composed of personal computers, work stations, and the like, and have a document preparation program (not shown) relating to the present invention. A printing information file generated by this document preparation program is described in Interpress of Xerox, Inc., but may be another page description language such as PostScript (trade name of Adobe Systems Inc.), or graphic command such as GDI (Graphic Device Interface, trade name of Microsoft Inc. U.S.A.) and Quick Draw (trade name of Apple, Inc. U.S.A.).

The image forming apparatus 10 outputs printing information transferred from the client calculators 31, 32, ... to the print engine 40 after raster-processing. The image forming apparatus 10 is constructed in such a manner as to combine; a control processor 15 including an instruction sequence division unit 11, a dependence analysis unit 12, a control information configuration unit 13 and a scheduling unit 14; painting instruction arithmetic units 16*a*, 16*b* and 16*c* for executing instruction sequence to generate pixel information; a page memory 17 for collecting and retaining pixel information generated by each painting instruction arithmetic unit 16*a*, 16*b* and 16*c*; and a printer interface 18 with internal bus 19. Also, the dependence analysis unit 12 is composed of an operation space decision unit 12*a* and an interference determination unit 12*b*, and the control information configuration unit 13 is composed of a dependence list control unit 13*a* and a dependence list 13*b*. Image information formed on the page memory 17 is outputted to the print engine 40 through the printer interface 18.

Each painting instruction arithmetic unit 16*a*, 16*b* and 16*c* has local memories only required to process and execute the instruction sequence. In this embodiment, the image forming apparatus 10 has three painting instruction arithmetic units. Although this number does not relate to the essence of the present invention, it is preferably within a range of 2 to about 32 in view of the communication efficiency of the common bus.

The print engine 40 is a color page printer using a laser scanning electrophotography system capable of outputting a full color image by repeating exposure, development and transfer for each color of CMYK (cyan, magenta, yellow and black) colors. As the performance, it has, for example, recording size of A3, resolution of 400 dpi (dot per inch), and gradation of 8 bits each color. Accordingly, in this embodiment, the page memory 17 has at least 128 MB (Mega Byte).

In this respect, each processing unit on the control processor 15 constituting the main portion of the present invention is, in this embodiment, incorporated in the image forming apparatus 10, but the present invention is not limited thereto, but means for performing a similar process may be incorporated in the client calculators 31, 32, . . . .

Next, each component element of the image forming apparatus 10 will be described in detail.

Printing information transmitted from the client calculators 31, 32, . . . is a program in page description language (hereinafter, referred to as PDL) generated by document processing application software (or built-in driver) on the client calculators 31, 32, . . . . The instruction sequence division unit 11 divides this source code into units in which one painting instruction is only executable. A range of arranging in parallel, which is the target in this embodiment, is based on the instruction of so-called graphic painting, and division processing of the raster image is excluded.

It goes without saying that the present invention is applicable to painting instruction rows of a simpler type than the page description language, and it is applicable to all types of painting instruction systems if a painting range to be described later can be presumed concerning a certain unit of painting.

In the dependence analysis unit 12, the operation space decision unit 12*a* determines a range in which a painting instruction in the instruction sequence operates in the image forming space. An operation range determined here is accumulated in the dependence list 13*b* in the control information configuration unit 13. At this time, the dependence list control unit 13*a* in the control information configuration unit 13 relates a new operation range to be inputted to operation ranges inputted so far to update the dependence list 13*b*. The interference determination unit 12*b* is a module, which effects an analytic operation for this relating. The operation and data expression of each functional module described above will be described below.

In the operation space decision unit 12*a*, the expression form of the operation range can be more securely executed without extraction of parallelism being leaked, the closer is it to the actual painting range. However, the closer is the expression of operation range to the actual painting, the operational amount required to decide upon the operation range, and the operational amount required to determine the interference increase more as a processing overhead. In this embodiment, as one of the adequate balance points concerning this trade-off, convex closures are used to express the content of painting. This selection has been made because of the following good properties of the convex closure.

More specifically, conic curves and Bezier curves often used for painting are included in a convex closure formed by start point/control point/end point, and association (overlap) of convex closures themselves can be determined by a simple process, and a synthetic convex closure consisting of a plurality of convex closures can be also constituted by a simple process.

In this respect, the operation range of the painting instruction can be easily expressed not only by this convex closure form, but also by using a circumscribed rectangle or a so-called simple polygon. In the case of a circumscribed rectangle, determination of association (overlap) and synthesis of areas can be further simplified, but since deviation of the area from the painting entity increases, a case where an example, in which there is no overlap actually, is determined to have overlap, increases. On the contrary, in the case of a simple polygon, coincidence between area and painting entity increases as compared with the convex closure, but the throughput of determination of association (overlap) and area synthesis increases.

In order to determine association (overlap), the operation range of a painting instruction constituted by the operation space decision unit 12*a* will be described below.

Figure 3:
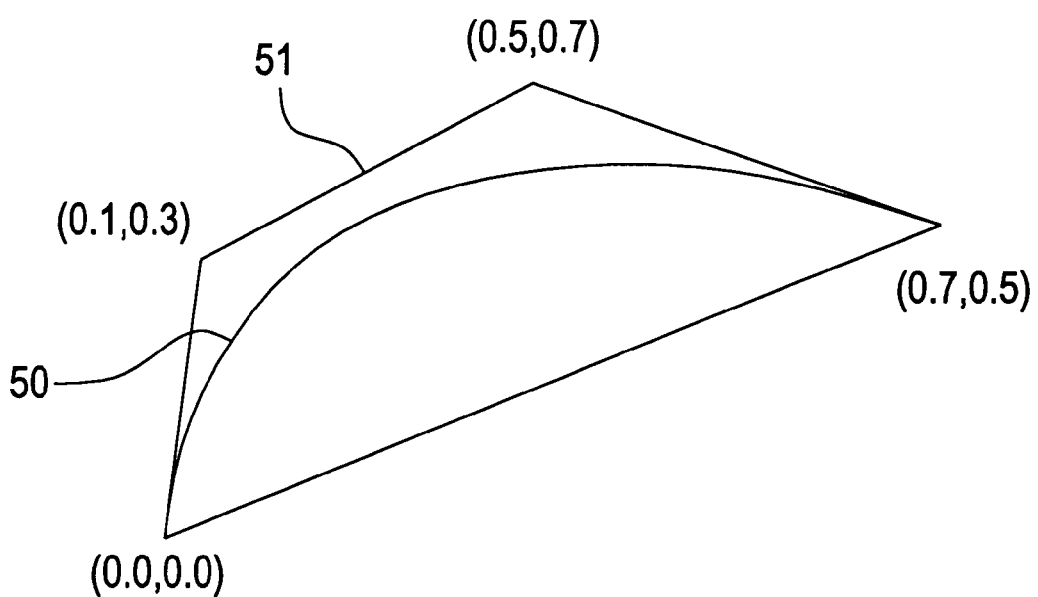
FIG. 3 is an explanatory view showing an example of construction of a convex closure.

FIG. 3 is an explanatory drawing showing a structural example of a convex closure, and FIG. 4 shows an expression example for operation range of the convex closure.

This example shows a case where the painting instruction is a Bezier curve 50. In this example, the Bezier curve 50 is represented by a start point (0.0, 0.0), two control points (0.1, 0.3) and (0.5, 0.7), and an end point (0.7, 0.5), and a quadrilateral (0.0, 0.0, 0.1, 0.3, 0.5, 0.7, 0.7, 0.5) for enveloping this Bezier curve 50 is regarded as a convex closure 51 representing the operation range.

A painting instruction for a Bezier curve 50 drawn out from the instruction sequence division unit 11 has been described in coordinate points of the start point, control points and end point within instruction sequence Di, and therefore, the convex closure area for limiting the painting area for the Bezier curve 50 is expressed in the form of "CONVEX (coordinate point list)" as shown in FIG. 4, and how the area is occupied by the graphic is represented by a polygon having these coordinate points as vertexes.

The operation range (convex closure) extracted by the operation space decision unit 12*a* is constituted as the dependence list 13*b* by the dependence list control unit 13*a* of the control information configuration unit 13. The dependence list 13*b* here means information expression obtained by constituting a plurality of operation ranges by the overlapped relation among them as a list of semi-order relation. A structural example of the dependence list will be described below.

Figure 5:
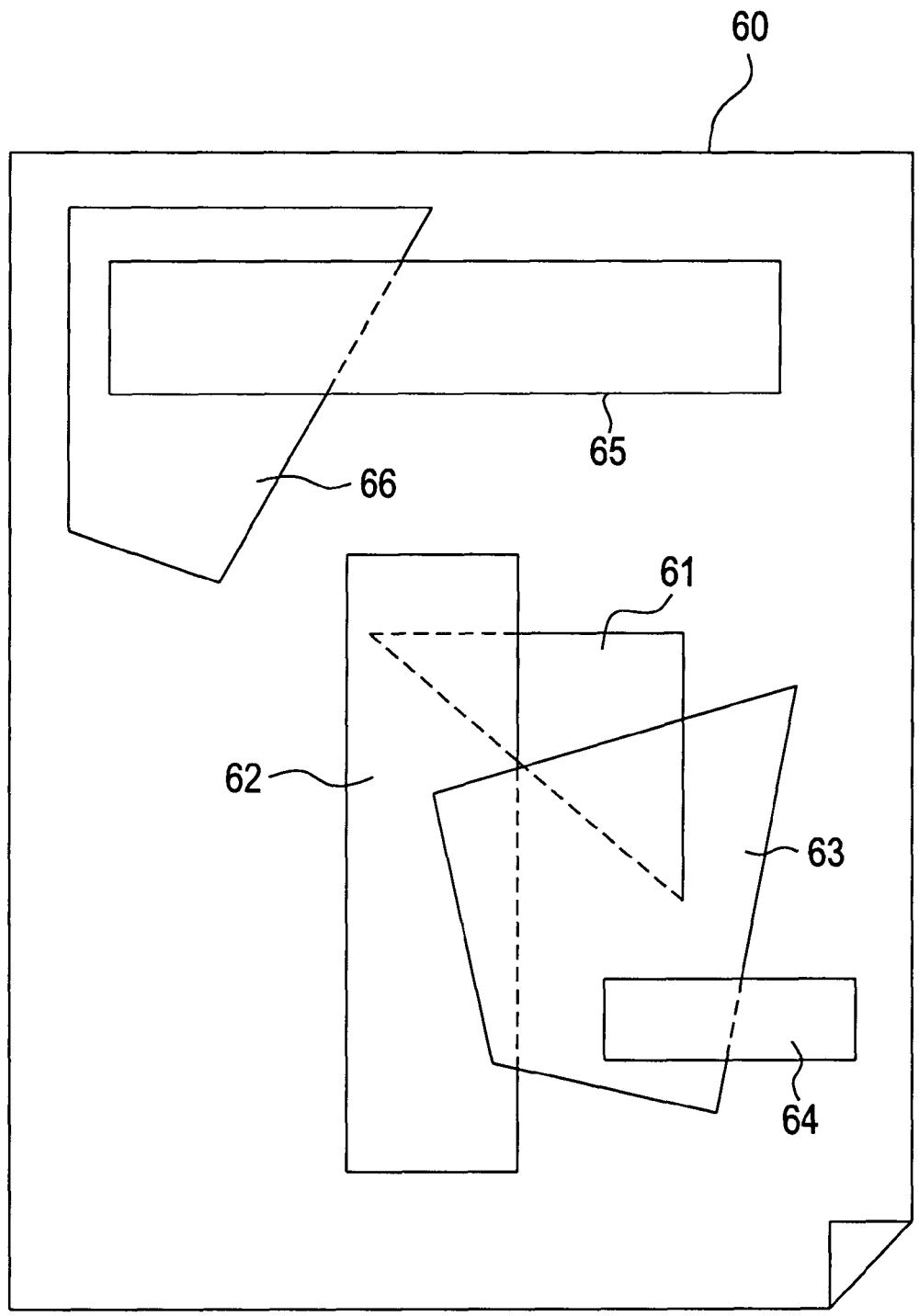
FIG. 5 is a view showing an example of an image to be generated by an instruction sequence.
Figure 6:
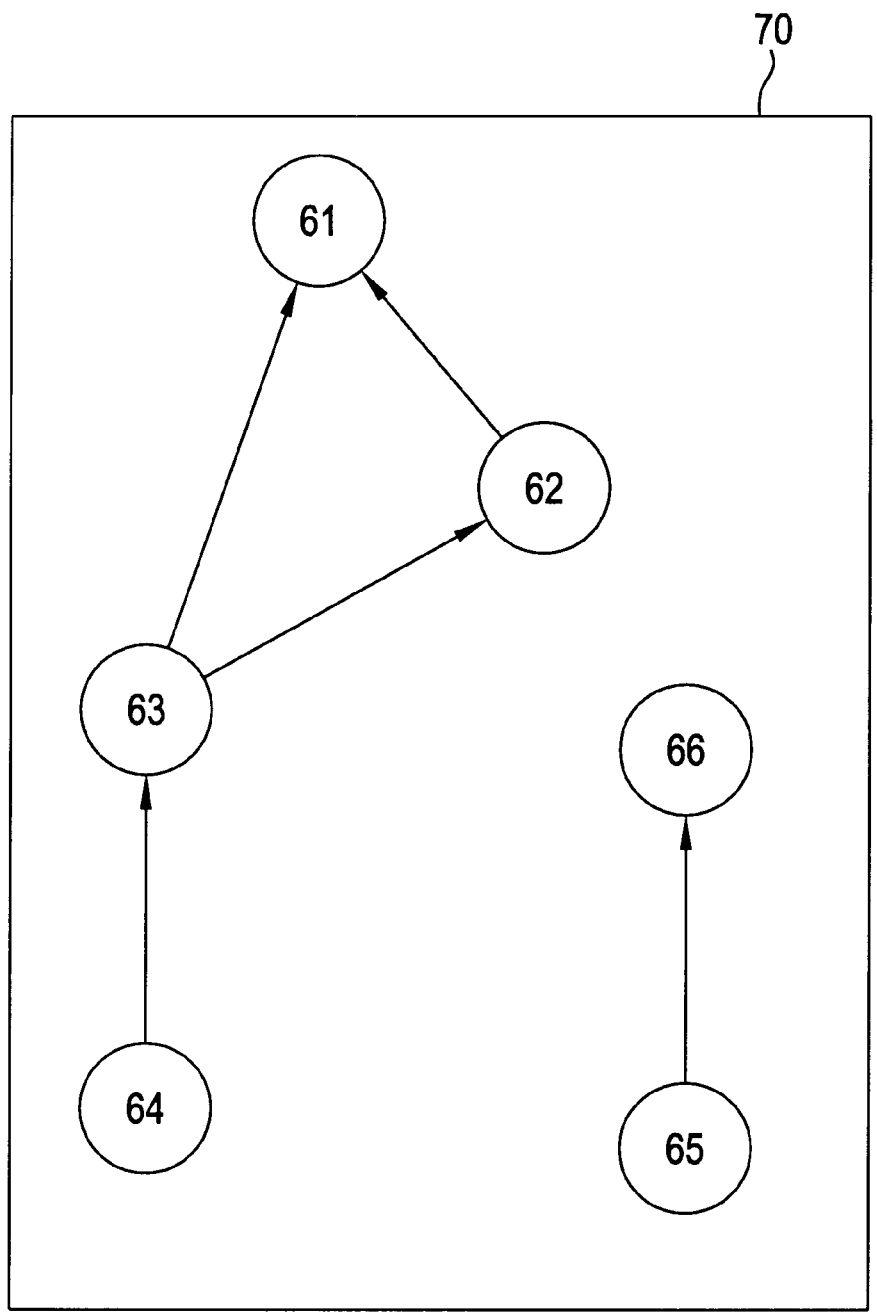
FIG. 6 is a view showing an example of a dependence list.

FIG. 5 is a view showing an example of an image to be generated by the instruction sequence, and FIG. 6 is a view showing an example of the dependence list.

In FIG. 5, for example, six graphic forms are painted on paper surface 60, and each graphic form is represented by the operation ranges extracted by the operation space decision unit 12a respectively. In this case, an operation range 62 overlaps an operation range 61, an operation range 63 overlaps the operation range 61 and the operation range 62, and moreover an operation range 64 overlaps the operation range 63. Also, an operation range 65 overlaps an operation range 66 elsewhere.

Such overlap relation of operation ranges is represented by a dependence list 70 as shown in FIG. 6. This dependence list 70 is represented by tree structure composed of a node of instruction sequence for painting a graphic form, and an arrow (directed branch) having a direction showing overlap relation. The sign shown in the node here corresponds to the sign of the operation range shown in FIG. 5. According to this dependence list 70, by seeing the direction of the directed branch between nodes, it is possible to know the overlap relation of operation ranges, and the number of overlap of operation ranges by the number of directed branches. The dependence list 70 shown in FIG. 6 is prepared by the control information configuration unit 13, and is retained in the dependence list 13b, and is internally represented by the following list.

{(64 (63 ((61) (62 (61))))) (65 (66))}

Each element 61 to 66 for constituting this list is a pointer to each operation range, i.e., coordinate point list showing a convex closure. A method of constituting such dependence list will be described below.

Figure 7:
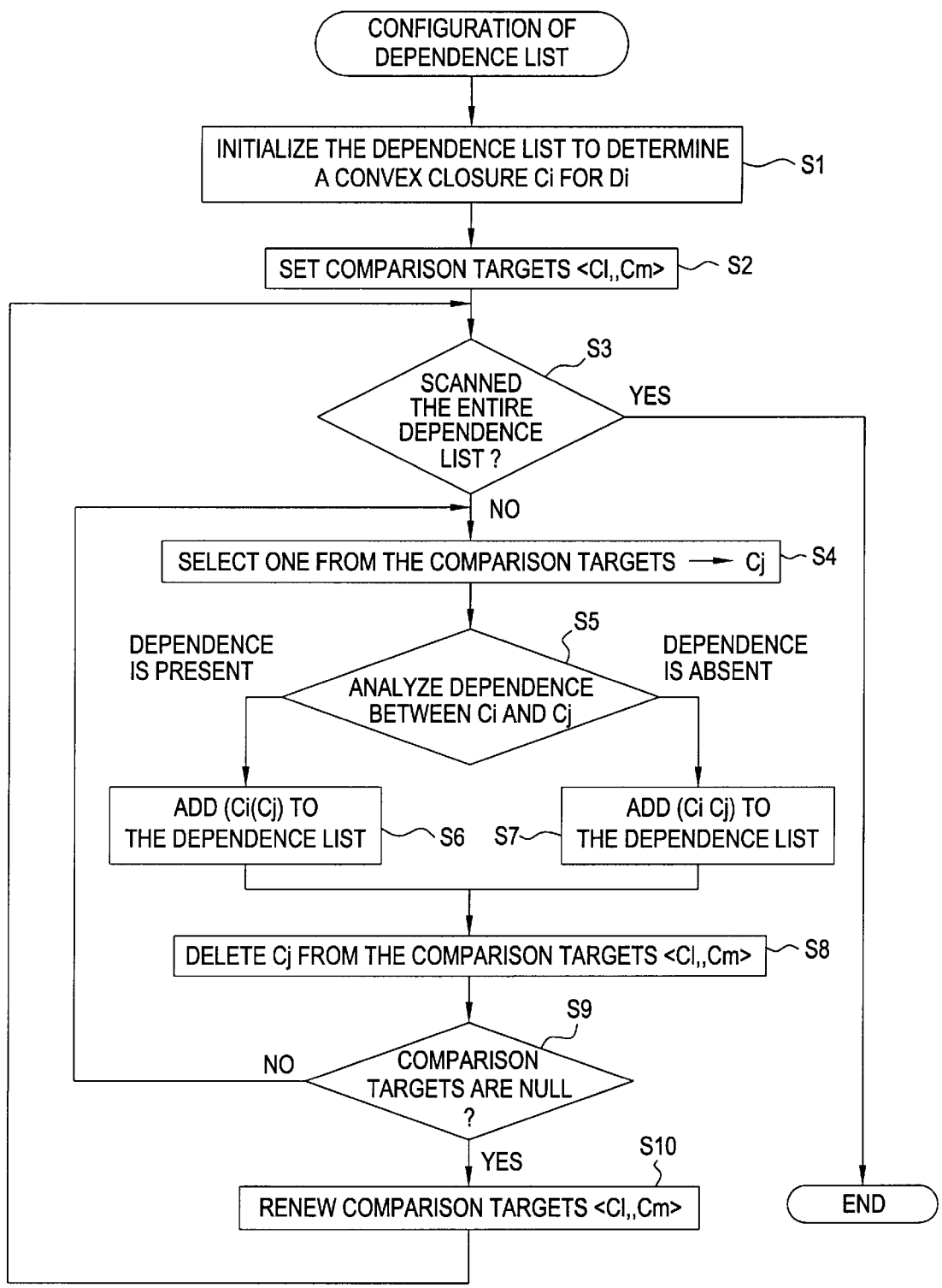
FIG. 7 is a flow chart showing a flow of processing of a dependence list control unit.

FIG. 7 is a flow chart showing a flow of processing of the dependence list control unit.

First, the dependence list is initialized to null, and concerning a painting block Di inputted from the instruction sequence division unit 11, its convex closure Ci is determined (S1). Next, a comparison target node group {C1,, Cm}, for which dependence analysis is effected with the convex closure Ci, is decided upon in the dependence list (S2). Concerning this decision method, several methods will be described later. In this respect, as the comparison target, the entire dependence list is not taken, but the partial sets {C1,, Cm} of the dependence list are stepwise compared and determined. This is because the efficiency of comparison process is enhanced. If only the dependence is merely analyzed, the purpose can be achieved even by comparing with all blocks in the dependence list. Next, it is judged whether or not all the blocks in the dependence list have been checked (S3), and if there are no comparison targets any longer in the dependence list, that is, if substantial comparison with all the elements has been completed, the constitution procedure of the dependence list is completed.

If there exist comparison targets in the dependence list, each painting block element {Cj|C1, . . . , Cm}, which has been set to the comparison target node group, is fed together with Ci to the interference determination unit 12b in the dependence analysis unit 12 (S4). In the interference determination unit 12b, it is determined whether or not there is dependence between Ci and Cj (S5). If dependence between Ci and Cj is found, the list elements are constituted with Ci as a parent node of Cj, that is, in the expression of (Ci (Cj)) (S6). At this time, Ci is always a temporary root node. If no dependence between Ci and Cj is found, (Ci Cj) is constituted as an independent node, and is added to the dependence list (S7). Cj, whose determination has been completed, is excluded from the comparison target node group (S8). Next, it is judged whether or not the comparison target node remains (S9), and if the comparison target node still remains, the process returns to the step S4 to repeat the procedure from the step S4. If the comparison target becomes null, that is, if all Cj and Ci of the comparison target node group {Cj|C1, . . . , Cm} are compared, a comparison target is set and updated from other than those which have already been set as comparison target in the dependence list (S10). At this time, the dependence list constituent procedure is repeated from the step S3 to compare the entire dependence list.

Hereinafter, the methods in the aforesaid steps S2 and S10, that is, three heuristic methods for effectively prescribing the comparison target node group to efficiently search will be described.

The first method is based on root propagation.

The initial value for the comparison target node Cj starts when a root node Rm in the dependence list is set. This is because the root node in the dependence list belongs to the highest layer of the painting block, and if its dependence on them were detected, painting blocks existing in the lower layer of the painting block, that is, all nodes belonging to the downstream side of the root node would not have to be analyzed in terms of dependence. On setting the root node Rm, a scanned flag is set to each of these nodes to indicate that scanning has been made. From next time, only sets, for which scanned flags have not been set, will be taken up.

After the completion of check on the root node, the comparison target node Cj is updated to a node group Rm', to which a child node group of each root node, that is, any of the root nodes Rm is connected through one edge, to request the dependence analysis unit 12 for processing. At this time, the scanned flag is set to each Rm'.

Hereafter, this operation is repeated until the last node group, that is, all leaves are set to Cj.

The second method is based on depth priority.

As in the aforesaid first method, for the initial value for the comparison target node Cj, the root node Ri in the dependence list is set. In this method, on adding a new node Ci to the dependence list, a depth value Zi of the node on the screen is added in advance. In other words, if the root node C0 is, for example, Z=5, its child node becomes Z=4, and its grandson node becomes Z=3. And, the comparison target node Cj will be set from the highest Z value downward.

As the reason, the higher the Z value is, the comparison target node Cj is on the vertex of the more overlapped image elements, and if the dependence on the painting block is detected, the analysis process on dependence on many painting blocks existing in the lower layer can be omitted. If the dependence on a certain Cj is detected, all node groups which become descendants of the Cj may be ignored, and therefore, scanned flags are set to them without comparing them with Cj, and they will not be caused to be the prospective comparison target nodes in the following processes. The updating of the comparison target node is completed when the analysis of node group of Z=0 has been finished.

The third method is based on area priority.

As in the aforesaid first method, as the initial value for the comparison target node Cj, the root node Ri in the dependence list is set. In this method, on adding a new node Ci to the dependence list, a value Si in which the degree of spread of the node on the screen is reflected is attached in advance. Si can be set by various parameters, but the processing can be simplified by setting it to, for example, the circumscribed rectangle area of the convex closure Ci. That is, $$Si=\{\max (Cikx)-\min (Cikx)\}\times\{\max (Ciky)-\min (Ciky)\}$$

Si which follows the above equation is attached to each element Ci in the dependence list. In the equation, Cikx relates to a coordinate value of each axis of the element coordinate point Cik of Ci, Ciky relates to a coordinate value of each axis of the element coordinate point Ciy of Ci, and max and min operations relate to k.

The comparison target node Cj is set from the highest Si value downward. As the reason, the higher the Si value is, the higher the probability of interfering with the target area can be expected to be. If Cj which is interfering is found, all node groups which become descendants of Cj are ignored to set scanned flags as in the second method.

Hereafter, the entire dependence list is searched from the highest Si value downward, and this operation is repeated until scanned flags are set to all nodes.

In this respect, each of the aforesaid methods can be carried out even if those are combined with each other, as a matter of course. For example, in the first method, by allowing the dependence analysis order in the sets of the node group Rm' to follow the depth value Zi or the degree of spread Si, it becomes possible to further expect reduction of Rm' itself.

Next, the interference determination unit 12b of the dependence analysis unit 12 will be described.

The interference determination unit compares two operation ranges, that is, two convex closure areas Ci and Ci' in this embodiment to determine the overlapability. However, the interference determination process for convex closures themselves is likely to provide a load for processing. On the other hand, painting elements in general printing information do not so frequently interfere. Thus, in this embodiment, the independence between two operation ranges is analyzed in units of circumscribed rectangle, which is rougher than the convex closure, and only those whose independence could not be detected are finely analyzed in view of convex closure area.

Figure 8:
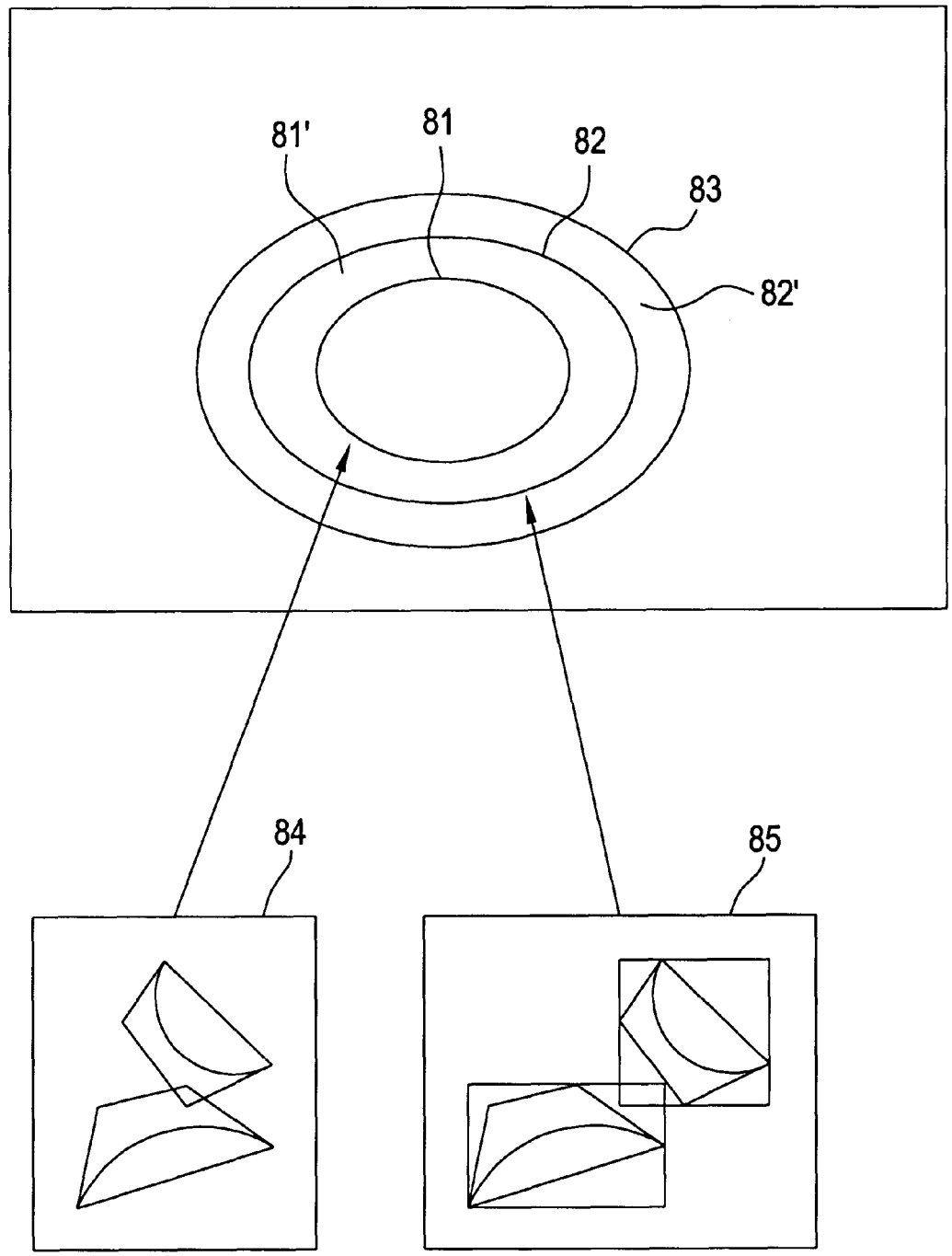
FIG. 8 is an explanatory view for explaining formation of interference relation.

FIG. 8 is an explanatory drawing for explaining the formation of interference relation.

This is a venn diagram in which the interference relation among painting elements is handled as set elements. In this diagram, a case where the entities themselves of painting elements actually interfere with one another is indicated by a set 81. It can be seen that this set 81 is included in a set 82 when its convex closure area interferes, and further the set 82 is included in the set 83 when the circumscribed rectangle of the convex closure interferes.

As shown by a sign 84, when the painting element is independent, but the convex closure area interferes, the painting element enters an area 81'which is not included in the set 81, but is included in the set 82. Also, when, as shown by a sign 85, the convex closure area of painting element is independent, but its circumscribed rectangle interferes, the convex closure area enters an area 82' which is not included in the set 82, but is included in the set 83.

Thereby, the interference determination process analyzes the independence between two operation ranges in the units of circumscribed rectangle which is rougher than the convex closure at the beginning to thereby narrow down to the set 83 whose independence could not be detected, and further only those whose independence could not be detected are finely analyzed in view of the convex closure area to thereby eliminate wasteful processing. Hereinafter, the operation of this interference determination unit 12b will be described.

Figure 9:
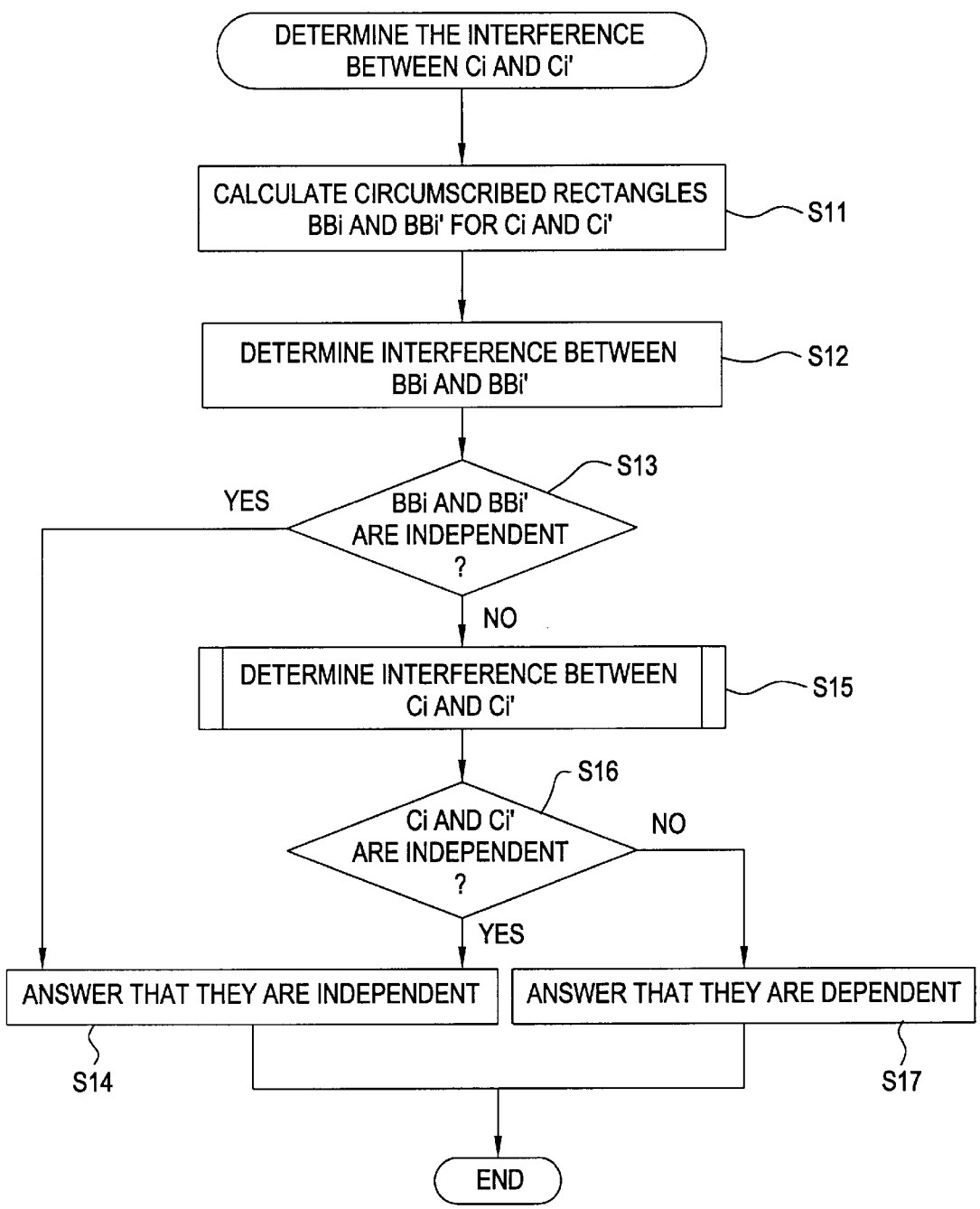
FIG. 9 is a flow chart showing a flow of processing of an interference determination unit.

FIG. 9 is a flow chart showing a flow of processing of the interference determination unit.

First, as the initialization, two areas (convex closure) Ci and Ci' to be compared are stored on a scratch pad memory to calculate respective circumscribed rectangles BBi and BBi' of Ci and Ci' (S11). When Ci is represented by Ci: $\{(Cx1, Cy1), \ldots, (Cxm, Cym)\}$, the circumscribed rectangle BBi of the convex closure Ci can be simply calculated as BBi: $\{(\min [Cxi], \min [Cyi]), (\max [Cxi], \max [Cyi])\}$.

Next, the interference between BBi and BBi' thus determined is determined (S12). As regards the determination of the interference between rectangles BBi and BBi', when BBi is represented as follows:

BBi: $\{(Bx1, By1), (Bx2, By2)\}$ (where (Bx1, By1) is a left lower coordinate point of BBi, and (Bx2, By2) is a right upper coordinate point of BBi), if a relation of $\{(Bx1'>Bx2') \wedge (Bx2>Bx2') \wedge (By1>By2')$ $\wedge (By2>By2')\} \vee$ $\{(Bx1'>Bx2) \wedge (Bx2'>Bx2) \wedge (By1'>By2) \wedge (By2>By2)\}$
is satisfied, conditional determination that the two are independent applies.

Whether or not the determination result is independent is determined (S13), and if it is determined that BBi and BBi' are independent, Ci and Ci' are also independent to output to that effect (S14). If it is determined that BBi and BBi' are not independent, they are returned to the original convex closures Ci and Ci' to further finely determine the interference (S15). Thus, it is determined whether or not the result of determination of interference between convex closures Ci and Ci' is independent, (S16), and if it is determined to be independent, output to that effect is effected (S14), and if it is determined that Ci and Ci' are not independent, output to that effect is effected (S17) to complete the procedure.

As regards interference determination of convex closures Ci and Ci' in the step S15, the intersection between sides themselves for constituting Ci and Ci' is first determined, and if the sides do not intersect at all, the inclusion between Ci and Ci' is determined. Its procedure will be described in detail below.

Figure 10:
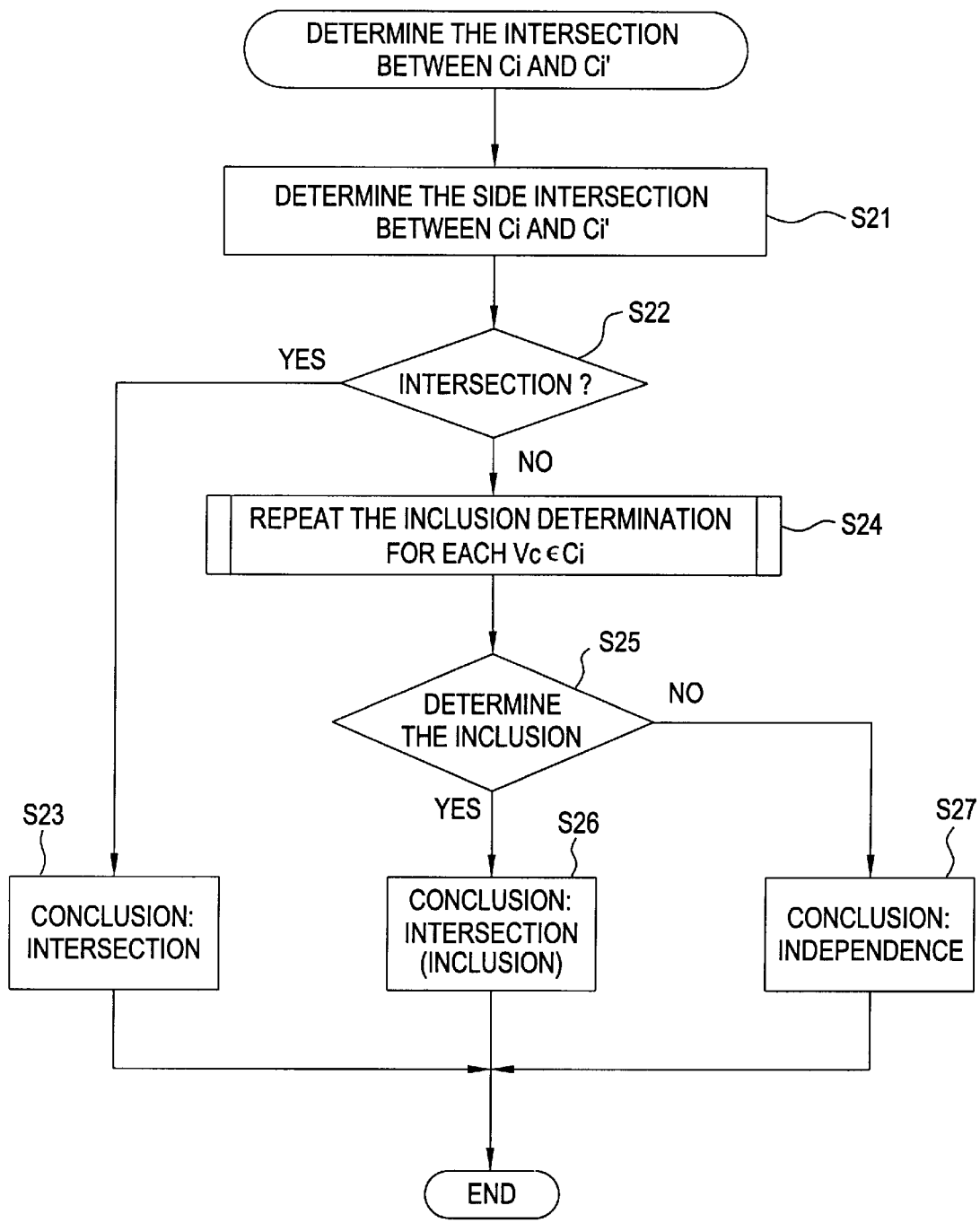
FIG. 10 is a flow chart showing a flow of interference determination of the convex closure.

FIG. 10 is a flow chart showing a flow of interference determination of a convex closure.

In the determination procedure of intersection between convex closures Ci and Ci', sides Ev and Ev' are first selected one by one from Ci and Ci'. These two sides are composed of two adjacent points, of vertexes included in Ci or Ci'. Thus, intersection between sides selected Ev and Ev' is determined (S21). In this intersection determination, two points for constituting Ev may be on the same side with respect to the straight line including Ev', or conversely two points for constituting Ev' may be on the same side with respect to the straight line including Ev. As regards, for example, on which side of a semi-plane constituted by the straight line there are two points A and B, it can be distinguished by substituting each of two points into an equation of a straight line, $F(x, y)=0$ to determine coincidence of the signs. More specifically, if sgn $(F(A)=F(B))$, they are on the same semi-plane, and if sgn $(F(A) \neq F(B))$, they are on the different semi-planes. This determination are carried out for all Ev∈Ci'.

Whether or not there was side intersection is determined by intersection determination (S22), and if even one intersection is found, output to the effect that Ci and Ci' intersect is effected (S23) to complete the procedure.

If no intersection is found in all Ev∈Ci', Ci and Ci' do not intersect with each other. In that case, since Ci and Ci' are sparse (independent) or in inclusive relation, inclusion determination is performed for each vertex Vc∈Ci (S24). The following conclusion is drawn from the inclusion relation between vertexes and convex closure (S25).

If a certain vertex Vc∈Ci is included in Ci' or a certain vertex Vc'∈Ci' is included in Ci, Ci and Ci' are regarded to be in (inclusive) overlap relation, and are determined as intersection (S26) to complete the procedure.

If all vertexes Vc∈Ci are not included in Ci', nor are all vertexes Vc∈Ci' included in Ci, Ci and Ci' are regarded as independent, and are determined as independent (S27) to complete the procedure.

A procedure for determining inclusive relation between vertexes and convex closures, which has been used in the step S24 for the aforesaid intersection determination procedure, will be described.

Figure 11:
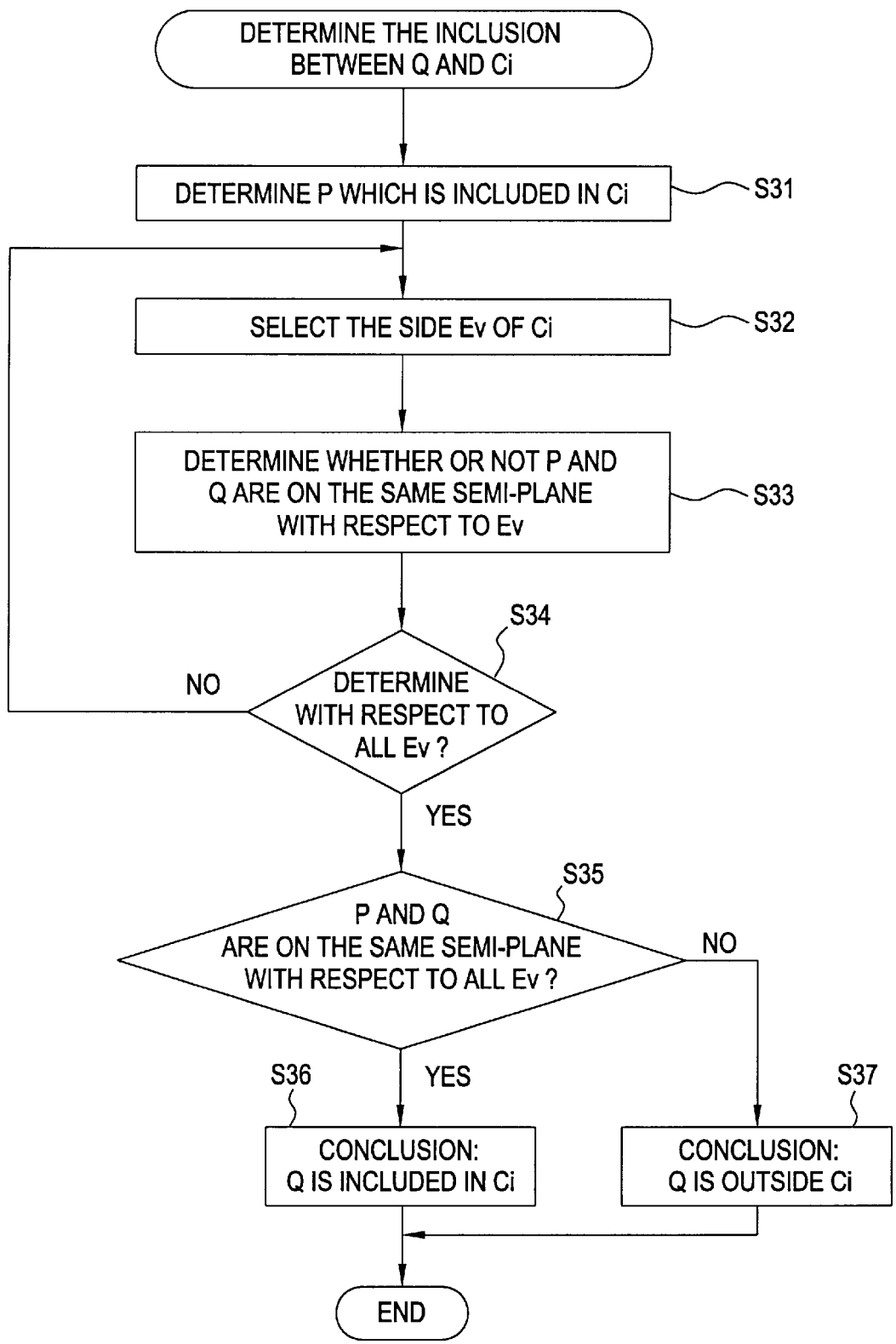
FIG. 11 is a flow chart showing a flow of determination of inclusive relation between vertex and convex closure.

FIG. 11 is a flow chart showing a flow of inclusive relation determination between vertexes and convex closures.

In the inclusion determination procedure for a vertex Q and a convex closure Ci, one point P included in the convex closure Ci is determined as an auxiliary point for the operation (S31). In this case, it is determined by obtaining a middle point between two arbitrary points, which are not adjacent to each other, of points Vc for constituting, for example, the convex closure Ci. Next, one of sides Ev for constituting the convex closure Ci is selected (S32). This is determined by two points Vc which are adjacent to each other. Next, it is determined whether or not Q and P are on the same side with respect to Ev (S33). This can be distinguished by substituting each of points Q and P into an equation of a straight line for representing Ev, $F(x, y)=0$ to determine coincidence of the signs. More specifically, if sgn $(F(Q) \neq F(P))$, they are on the same semi-plane, and if sgn $(F(Q)=F(P))$, they are on the different semi-planes. Whether or not Q and P are on the same side with respect to this Ev must be determined. It is determined whether or not this determination has been performed for all sides Ev for constituting the convex closure Ci (S34), and if there are sides Ev, for which the determination has not been performed, the process returns to the step S32 for selecting the sides Ev. In this way, the determination is repeated for all Ev∈Ci.

When the determination for all Ev∈Ci has been completed, it is determined for those all Ev∈Ci whether or not P and Q are on the same semi-plane (S35). If the determination result is that P and Q are on the same semi-plane with reference to all Ev∈Ci, a conclusion that Q is included in Ci is drawn (S36), and if P and Q are on different semi-planes respectively with respect to a certain Ev∈Ci, a conclusion that Q is outside Ci is drawn (S37) to complete the procedure.

The instruction sequence, for which interference determination has thus been performed, is added to the dependence list as a new node. The updating of the dependence list at this time will be described below.

Figure 12:
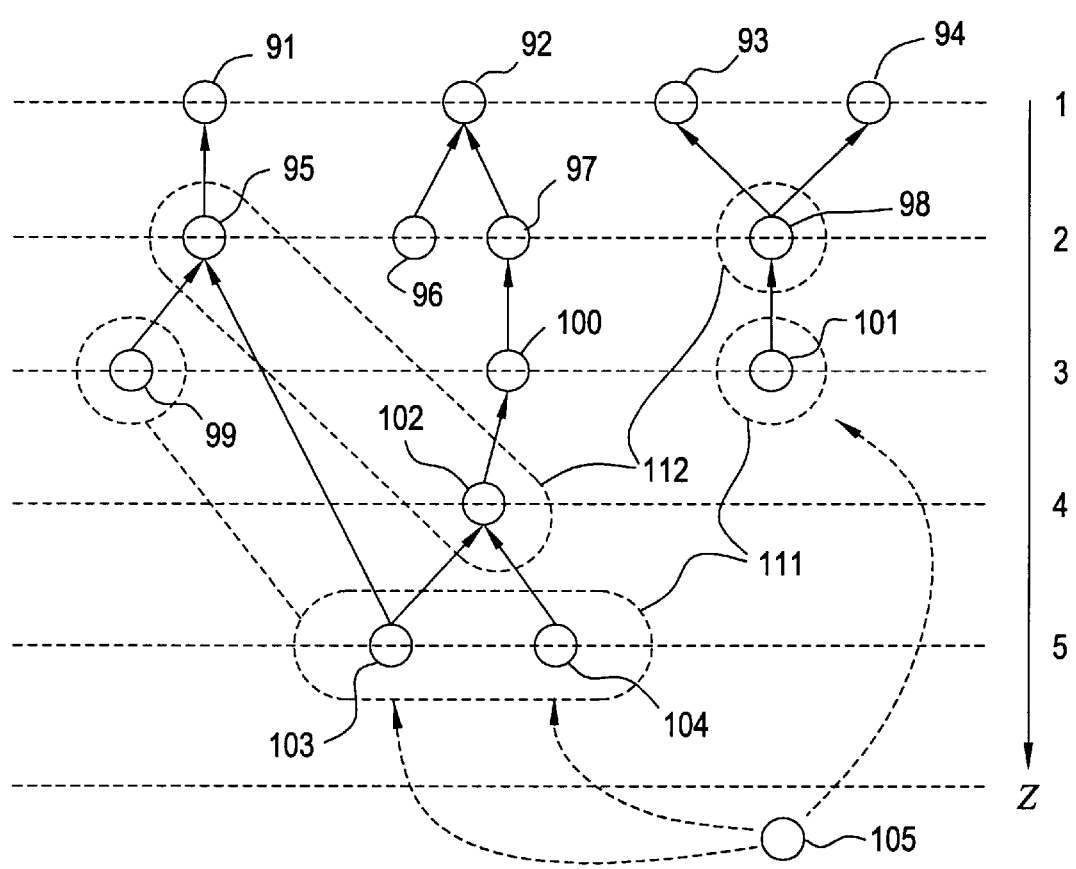
FIG. 12 is an explanatory view showing renewal of the dependence list.

FIG. 12 is an explanatory drawing for updating of the dependence list.

In FIG. 12, the dependence list is assumed as an example that nodes 91 to 104 of fourteen instruction sequences have already been constructed as shown as structural data. At this time, the dependence list is internally represented by the following list.

{(91 (95 (99) (103))) (92 (96 (97 (100 (102 ((103) (104)))))))) (93 (98 (101))) (94 (98 (101)))}

A case where a new node 105 of instruction sequence is added to the dependence list will be described.

Respective nodes of a root set 111 of the dependence list are first determined for interference. In this case, the root set 111 shows a node which has the highest overlap relation on the dependence list including nodes 99, 101, 103 and 104. If there is a node which has been determined to have interference in each node of the root set 111, a directed branch is provided for the node, and if not, anything is not performed.

If comparative analysis with all nodes of the root set 111 is completed, a set 112 for all child node groups of a node, for which no directed branch has been provided, that is, nodes 95, 98 and 102 are set to the next comparison target set. This setting corresponds to the step S10 in the operation explanatory drawing for the dependence list control unit shown in FIG. 7.

Hereafter, the determination of interference and the updating of the dependence list are repeated in the same manner until child nodes of the root set are not obtained any longer in the dependence list, that is, until all portions other than the low-order nodes of nodes whose interference has been detected from the dependence list are scanned. In this setting of a comparison target set, all nodes are not made to be comparison targets, but the low-order nodes of nodes whose interference has been detected are excluded from the interference determination targets to thereby enhance the processing speed.

Next, the scheduling unit 14 for constituting a processing schedule will be described on the basis of the dependence list thus generated at the control information configuration unit 13. The scheduling unit 14 prepares a schedule which is actually processed by a plurality of painting instruction arithmetic units on the basis of a reverse dependence list wherein the dependence relation of the dependence list is viewed from the reverse direction, that is, the processing order and allocation information to the painting instruction arithmetic units.

Figure 13:
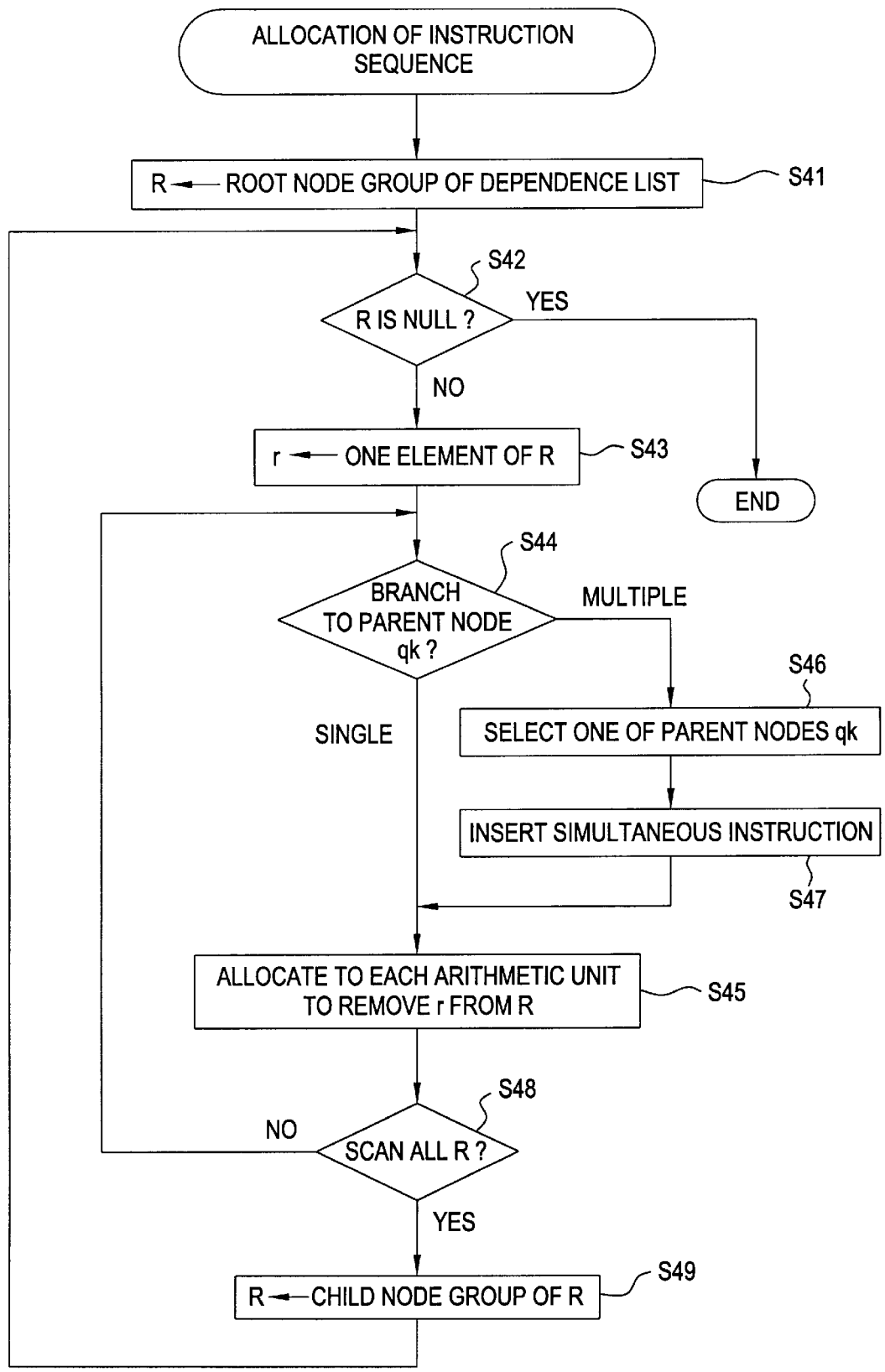
FIG. 13 is a flow chart showing the flow of processing in a scheduling unit.

FIG. 13 is a flow chart showing a flow of processing of the scheduling unit.

First, as initialization, a set R of root nodes in the reverse dependence list is set to divide R into the number p of the painting instruction arithmetic units (S41). The nodes or node groups thus divided enter an initial state of columns Si (i=1, p) of painting instruction sequence to be processed by each painting instruction arithmetic unit. Hereinafter, each Si is referred to as schedule. Each Si in this step may include a plurality of instruction sequences, but they may constitute a column Si in an arbitrary order. Hereafter, Si grows as a linear list. Next, R is updated to a set of entire child nodes of each element of R. It is determined whether or not R becomes null (S42), and if R is null, the processing is completed.

Next, one element rj of R is selected (S43), and the connecting relation of the rj to its parent node qk is examined (the parent node qk is the element of R one generation ago). It is determined here whether the connection (branch) to the parent node qk is single or plural (S44). If there is one branch from the element rj to the parent node qk is one piece, rj is added to the schedule Si, to which qk belongs, at its extreme rear, and is removed from R (S45). On the other hand, if there are w branches (w>1) from rj to the parent node qk, one qi is selected from qk in accordance with a criterion to be described later (S46). A synchronous label Lv is inserted in the schedule Si, to which qi belongs, at the extreme rear (S47), and rj is added immediately after that. On Lv, labels of all nodes, of child nodes of qk, which do not belong to Si, are described. If the content of Lv is null, it is not attached. This synchronous label is indicative information to confirm that all the processing results of Lv have been collected before rj is fed to the data collection unit.

Next, it is judged whether or not R has all been scanned (S48), and if there exists rj∈R which has not yet been scanned, the process returns to the step S43 to update rj. If all has been scanned, R is updated to child node groups of R (S49). The process returns to the step S42, and if there exists a child node in rj∈R, the steps S43 to S48 are repeated. If there does not exist any child node in the determination of the step S42, the processing is completed. Each Si is a column of instruction sequence to be processed by a painting instruction arithmetic unit i.

In the step S43, a method of selecting qi when there exist a plurality of preliminary jobs of rj is to use any or a combination of the following three heuristic criteria.

The first criterion is based on processing time. According to this criterion, assuming that the time, at which the processing for each schedule Si is completed, is T (Si), and the processing time for the job rj itself is t (rj), Si, whose TP (Si)+t (rj) becomes a minimum, is selected. According to this criterion, a quickest plan when attention is paid only to at least the processing time, is expected.

The second criterion is based on storage condition. According to this criterion, when {(local storage capacity of a processor in which each prospective schedule Si is arranged)−(storage capacity requested by job rj)} becomes a non-negative minimum value or when there exists no non-negative value, one which becomes a negative maximum value is selected. According to this criterion, each local memory can be effectively utilized without deteriorating the processing efficiency.

The third criterion is based on the size of the preliminary job. According to this criterion, qk is arranged on a common area which is the largest in the sum total of common areas (overlapped areas) between jobs qk and rj in each prospective schedule Si. Since the data transfer amount of the processing result can be regarded as a half in the common area between Si and qk, the communication overhead can be reduced according to this criterion. In this respect, since it becomes troublesome to calculate the overlapped area between convex closures themselves, the overlapped area for the circumscribed rectangles is substituted for it. An example of calculation of this overlapped area is shown below.

FIG. 14 is an explanatory drawing showing an overlapped area for circumscribed rectangles.

A circumscribed rectangle is represented by its left lower point and right upper point. Accordingly, two circumscribed rectangles are represented by BBa {(Xa1, Ya1), (Xa2, Ya2)} and BBb {(Xb1, Yb1), (Xb2, Yb2)}. At this time, even if it is assumed that $Xa1 \leq Xb1$, the generality is not lost. The overlapped area C can be obtained for each of the divisions in the following case.

Four cases when $Ya1 \leq Yb1$ will be described at the beginning.

Figure 14A:
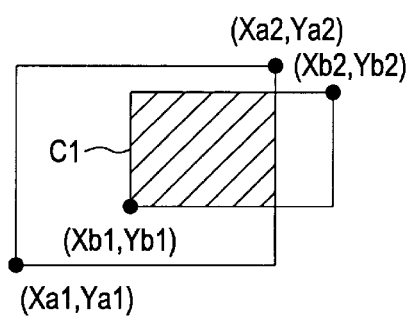
FIG. 14 is an explanatory drawing showing overlapped areas of circumscribed rectangles.

As shown in FIG. 14(A), further when $Xa2 \leq Xb2$ and $Yb2 \leq Ya2$, the overlapped area C1 can be obtained by BBC {(Xb1, Yb1), (Xa2, Yb2)}.

Figure 14B:
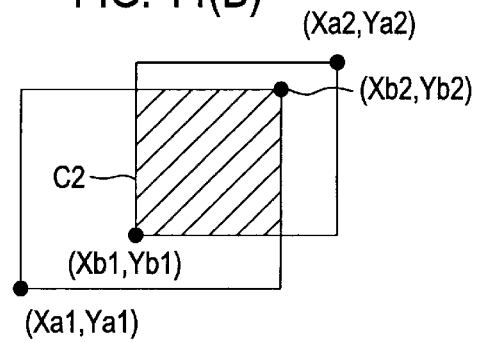

As shown in FIG. 14(B), further when $Xa2 \leq Xb2$ and $Ya2 < Yb2$, the overlapped area C2 can be obtained by BBC {(Xb1, Yb1), (Xa2, Ya2)}.

Figure 14C:
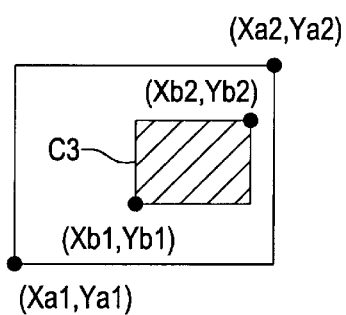

As shown in FIG. 14(C), further when $Xa2 > Xb2$ and $Yb2 \leq Ya2$, the overlapped area C3 can be obtained by BBC {(Xb1, Yb1), (Xb2, Yb2)}.

Figure 14D:
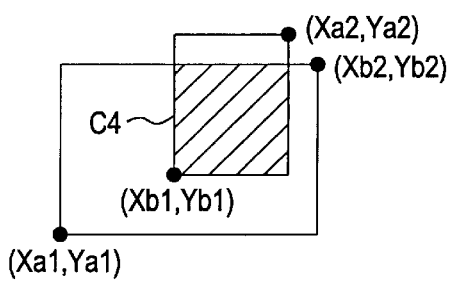

As shown in FIG. 14(D), further when $Xa2 > Xb2$ and $Ya2 < Yb2$, the overlapped area C4 can be obtained by BBC {(Xb1, Yb1), (Xb2, Ya2)}.

Next, the remaining four cases when $Ya1 > Yb1$ will be described.

Figure 14E:
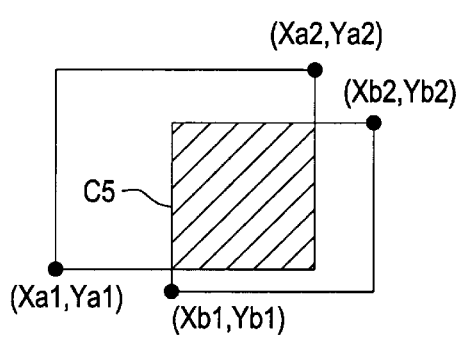

As shown in FIG. 14(E), further when $Xa2 \leq Xb2$ and $Yb2 \leq Ya2$, the overlapped area C5 can be obtained by BBC {(Xb1, Ya1), (Xa2, Yb2)}.

Figure 14F:
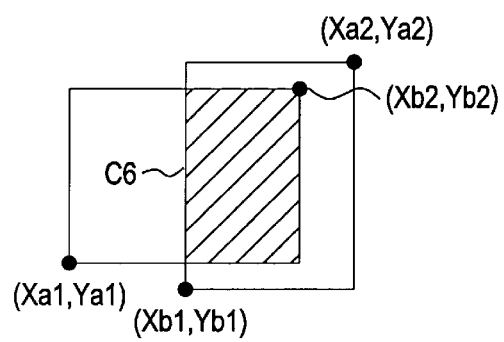

As shown in FIG. 14(F), further when $Xa2 \leq Xb2$ and $Ya2 < Yb2$, the overlapped area C6 can be obtained by BBC {(Xb1, Ya1), (Xa2, Ya2)}.

Figure 14G:
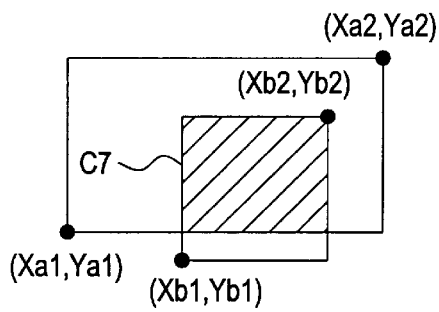

As shown in FIG. 14(G), further when $Xa2 > Xb2$ and $Yb2 \leq Ya2$, the overlapped area C7 can be obtained by BBC {(Xb1, Ya1), (Xb2, Yb2)}.

Figure 14H:
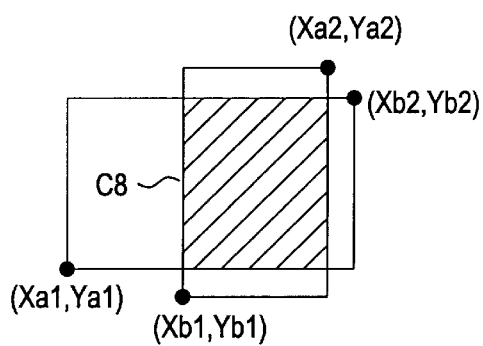

As shown in FIG. 14(H), further when $Xa2 > Xb2$ and $Ya2 < Yb2$, the overlapped area C8 can be obtained by BBC {(Xb1, Ya1), (Xb2, Ya2)}.

Figure 15:
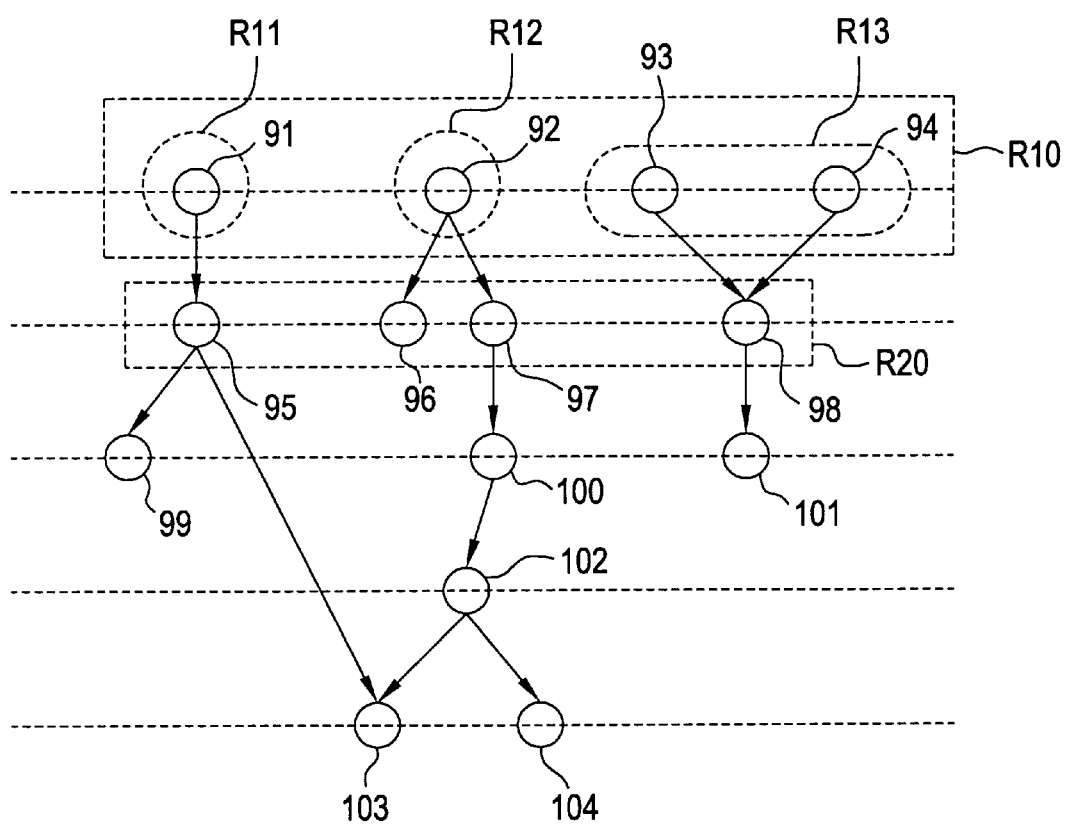
FIG. 15 is a conceptual diagram for explaining an example of scheduling.

FIG. 15 is a conceptual view for explaining an example of scheduling.

In FIG. 15, R10 designates a set R of root nodes in the reverse dependence list, and R11, R12 and R13, initial schedules S1 to S3 allocated to three painting instruction arithmetic units 16a to 16c respectively. When the allocation of the initial schedules is completed, the set R is updated from R10 to R20. Of the elements of R20, an node 95 is allocated to a schedule S1, nodes 96 and 97, to a schedule S2, and a node 98, to a schedule S3 respectively. Hereafter, allocation of nodes to each schedule S1 to S3 is performed in the same manner.

Thus, when the processing progresses and a node 103 is allocated, selection of schedule S1 or schedule S2 occurs. It is assumed here that the node 103 is allocated to the schedule S1. Accordingly, in the schedule S1, a synchronous label (102) is inserted before a sequence identifier {103}. This becomes indicative information to the effect to confirm the collection of sequence 102 before sequence 103 is transferred. As a result, the schedules S1 to S3 become as follows:

S1: 91, 95, 99, {102}, 103

S2: 92, 96, 97, 100, 102, 104

S3: 93, 94, 98, 101

Each schedule Si constructed as described above is transferred to each of i-th painting instruction arithmetic units. Each painting instruction arithmetic unit continues to paint the instruction sequence in the schedule in parallel so long as it is not confronted with the synchronous label transferred. The processing result of each instruction sequence is written in a page memory when the internal storage area becomes insufficient, but when the synchronous label is included in the course of processing, it is confirmed that the instruction sequence in the other painting instruction arithmetic unit, which has been indicated in the synchronous label, has been written, and its own result is written in the page memory. In this case, that the processing has been completed can be easily confirmed by placing a process progress table in a common memory (not shown).

As described above, according to the present invention, there are provided dependence analysis means for selecting, as a determination target for a subsequence to be solved, a subsequence which is independent of a subsequence having order dependence on the subsequence; and when a certain subsequence belongs to a plurality of parent subsequences, scheduling means for allowing it to be subordinate to only one subsequence of the plurality of parent subsequences, and adding wait instruction of waiting the processing of the parent subsequence other than the one subsequence before the one subsequence. For this reason, on processing painting instruction in parallel in a plurality of painting instruction processing devices, an effective parallel schedule is constituted even if there exist image elements overlapped one another, and a preliminary treatment for scheduling also requires only partial analysis. Therefore, the entire processing can be constituted without involving a great processing overhead, thus making it possible to execute painting instruction at high speed as effect of parallel processing.

What is claimed is:

1. An image forming apparatus for executing instruction sequence described in page description language by a plurality of painting instruction operation means, and synthesizing images processed by each painting instruction operation means by means of data collection means to form an overall image, comprising:

sequence division means for dividing said instruction sequence into a plurality of subsequences;

dependence analysis means for determining order dependence among subsequences for a plurality of subsequences divided;

control information configuration means for receiving a determination result of said dependence analysis means to the effect that a first subsequence is dependent upon a second subsequence, constituting structural data having order relation by giving a directed branch from said first subsequence to said second subsequence, and further instructing said dependence analysis means to exclude a subsequence, which receives a directed branch from said second subsequence, from determination targets for order dependence on said first subsequence; and scheduling means for receiving a subsequence group generated by said sequence division means, and if said first subsequence has only dependent relation on a subsequence, which exists in said painting instruction operation means at an allocatee, adding it to an execution system at said allocatee as it is, and then if said first subsequence has order dependence on said second subsequence which is allocated to said painting instruction operation means different from said allocatee, adding simultaneous information, to said execution system, for confirming that image data, wherein said second subsequence was processed, has been transferred to said data collection means, thereafter adding said first subsequence to said execution system.

2. An image forming apparatus as defined in claim 1, wherein said dependence analysis means comprises: painting area decision means for analyzing, when said subsequence includes graphic generation instruction, partial space areas to be painted in accordance with said graphic generation instruction; and area comparison means for determining whether or not said partial space areas thus analyzed are overlapped one another to determine dependent relation among said subsequences.

3. An image forming apparatus for raster-processing instruction sequence described in page description language to obtain pixel information, comprising:

sequence division means for dividing said instruction sequence in units of instruction of said image painting instruction into a plurality of subsequences of said image painting instruction;

dependence analysis means having operation space decision unit for setting operation space to which each of said subsequences corresponds, interference determination unit for determining interference among said operation space, and dependence list preparation unit for preparing a dependence list for said subsequences in which the determination result of said interference determination unit has been described;

subsequence allocation means for allocating processing of subsequences received from said sequence division means in response to said dependence list;

a plurality of painting instruction execution means for executing the subsequences allocated while retaining the respective dependent relation to generate partial pixel information; and data collection means for collecting partial pixel information from said plurality of painting instruction execution means to synthesize to pixel information based on said instruction sequence.

4. An image forming apparatus as defined in claim 3, wherein said dependence list is expressed by tree structure consisting of nodes wherein said subsequences having interference among said operation space in the up-and-down relation, are arranged in the depth direction, and nodes wherein said subsequences having no interference among said operation space in the up-and-down relation, are laterally arranged in parallel.

5. An image forming apparatus as defined in claim 3, wherein said dependence list is expressed by tree structure wherein said subsequences is expressed by nodes, and said dependence list preparation unit determines, when an arbitrary node is subordinate to one node of interference determination targets in accordance with the determination result of said interference determination unit, interference with said arbitrary node for other nodes than low-order nodes subordinate to said one node.

6. An image forming apparatus as defined in claim 3, wherein said subsequence allocation means allocates a root node having tree structure into a plurality of said painting instruction execution means on the basis of a reverse dependence list in which the dependent relation of said dependence list is viewed from the reverse direction, and when a specified node belongs to a plurality of parent nodes in accordance with the determination result of said interference determination unit, causes it to be subordinate to only one node of the plurality of parent nodes, and adds wait order for waiting processing of the other parent nodes than said one node before said one node.

7. An image forming apparatus as defined in claim 3, wherein said sequence division means, said dependence analysis means and said subsequence allocation means are arranged on client calculators dispersed on a network.

8. A method of forming images for executing instruction sequence for forming an image by means of a plurality of painting instruction operation means to form an image at high speed, comprising the steps of:

dividing said instruction sequence into a plurality of subsequences;

determining order dependence of processing among subsequences for each of a plurality of subsequences divided;

constituting structural data concerning the order relation of subsequences by giving, if a first subsequence is dependent upon a second subsequence, a directed branch from said first subsequence to said second subsequence;

judging whether or not said first subsequence has dependent relation only with a subsequence existing in painting instruction operation means at its allocatee;

allocating, if said first subsequence has no dependent relation outside of subsequences which exist at the allocatee, said first subsequence as it is to a first execution system, and allocating, if a second subsequence, which is allocated to any other allocatee than the allocatee of said first subsequence, has order dependence, said first subsequence together with synchronous information which confirms that the processing of said second subsequence has been completed, to said first execution system; and collecting images obtained by the execution of the subsequences at each painting instruction operation means to synthesize them to an overall image.

9. A method of forming images as defined in claim 8, wherein a step of determining said order dependence is to select, as a determination target for order dependence on said first subsequence, a third subsequence independent of said second subsequence having order dependence on said first subsequence.

10. A method of forming images as defined in claim 8, wherein a step of determining said order dependence is to analyze, when said subsequence includes graphic generation instruction, partial space processing areas to be painted by said graphic generation instruction to determine whether or not said partial space areas thus analyzed are overlapped one another, and to determine that there is dependent relation between said subsequences on the basis of determination that said partial space areas are overlapped one another.

11. A method of forming images as defined in claim 10, wherein said partial space processing area is expressed by convex closures of painting graphic.

12. A method of forming images as defined in claim 10, wherein said partial space processing area is expressed by circumscribed rectangles of painting graphic.

13. An image forming apparatus for executing instruction sequence described in page description language by a plurality of painting instruction operation means, and synthesizing images processed by each painting instruction operation means by means of data collection means to form an overall image, comprising:

sequence division means for dividing said instruction sequence into a plurality of subsequences;

dependence analysis means for determining order dependence among subsequences for a plurality of subsequences divided;

control information configuration means for receiving a determination result of said dependence analysis means to the effect that a first subsequence is dependent upon a second subsequence to constitute structural data having order relation by giving a directed branch from said first subsequence to said second subsequence;

scheduling means for receiving a subsequence group generated by said sequence division means, and if said first subsequence has only dependent relation on a subsequence, which exists in said painting instruction operation means at its allocatee, adding it as it is to an execution system at said allocatee, and if said first subsequence has order dependence on said second subsequence which is allocated to said painting instruction operation means different from said allocatee, adding simultaneous information, to said execution system, for confirming that image data, in which said second subsequence was processed, has been transferred to said data collection means, thereafter adding said first subsequence to said execution system.

* * * * *